Sept. 26, 1939.  B. G. RAND  2,174,180
MUSEUM AND DISPLAY CASE
Filed Oct. 12, 1937  5 Sheets-Sheet 1

Inventor
Benjamin G. Rand,
By
Attorney

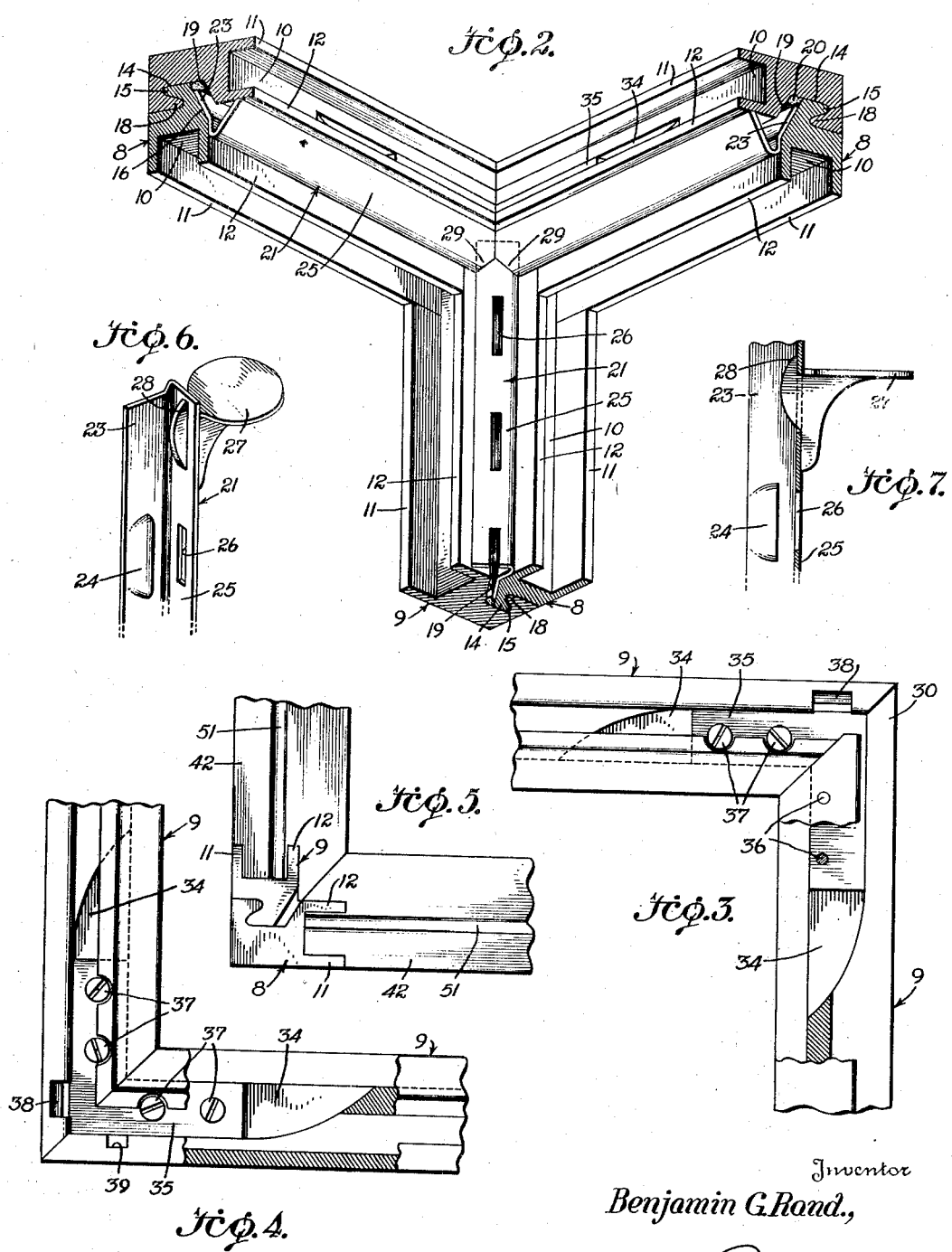

Sept. 26, 1939.　　　　　B. G. RAND　　　　　2,174,180
MUSEUM AND DISPLAY CASE
Filed Oct. 12, 1937　　　5 Sheets-Sheet 3
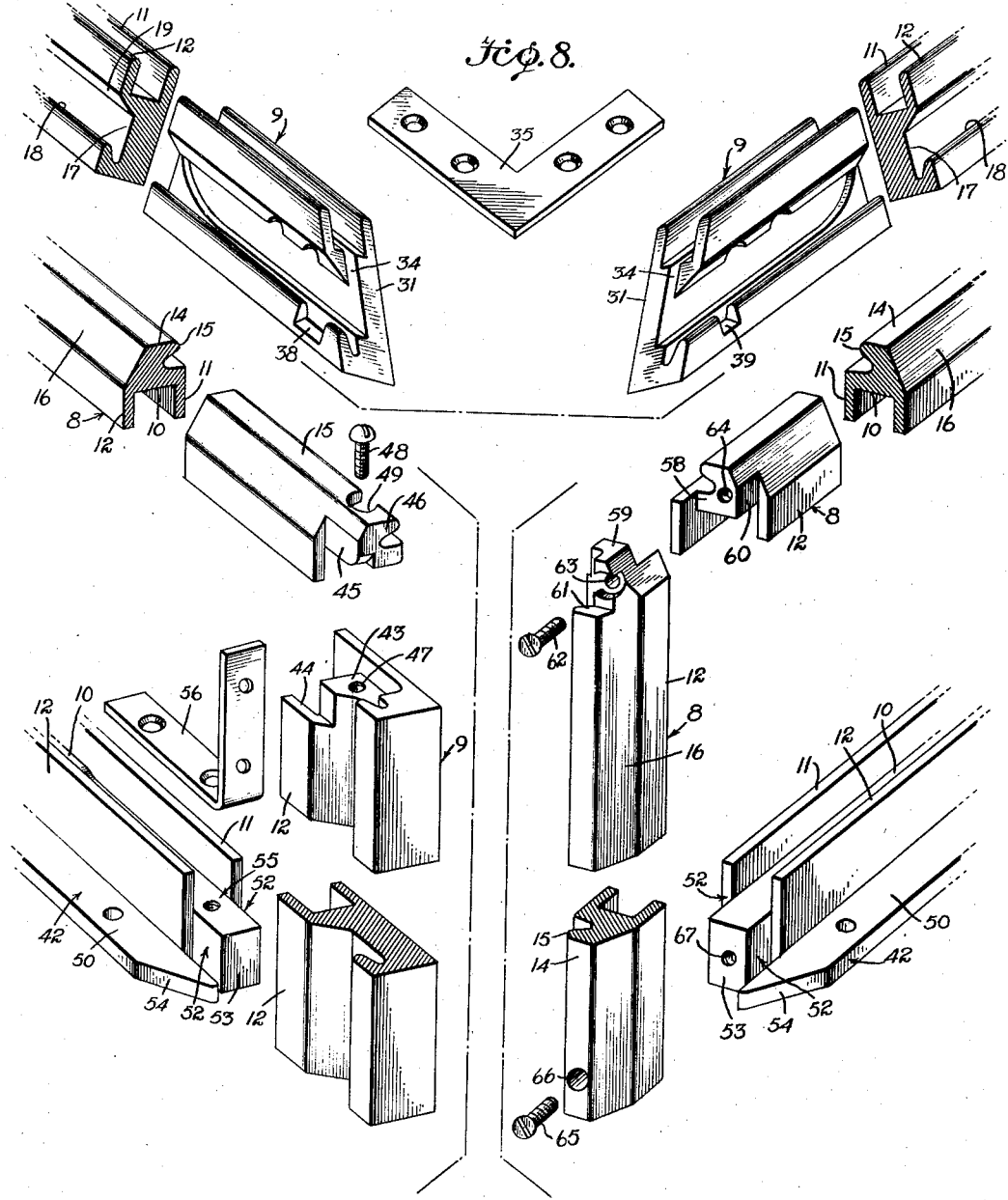
Inventor
Benjamin G. Rand,
By
Attorney

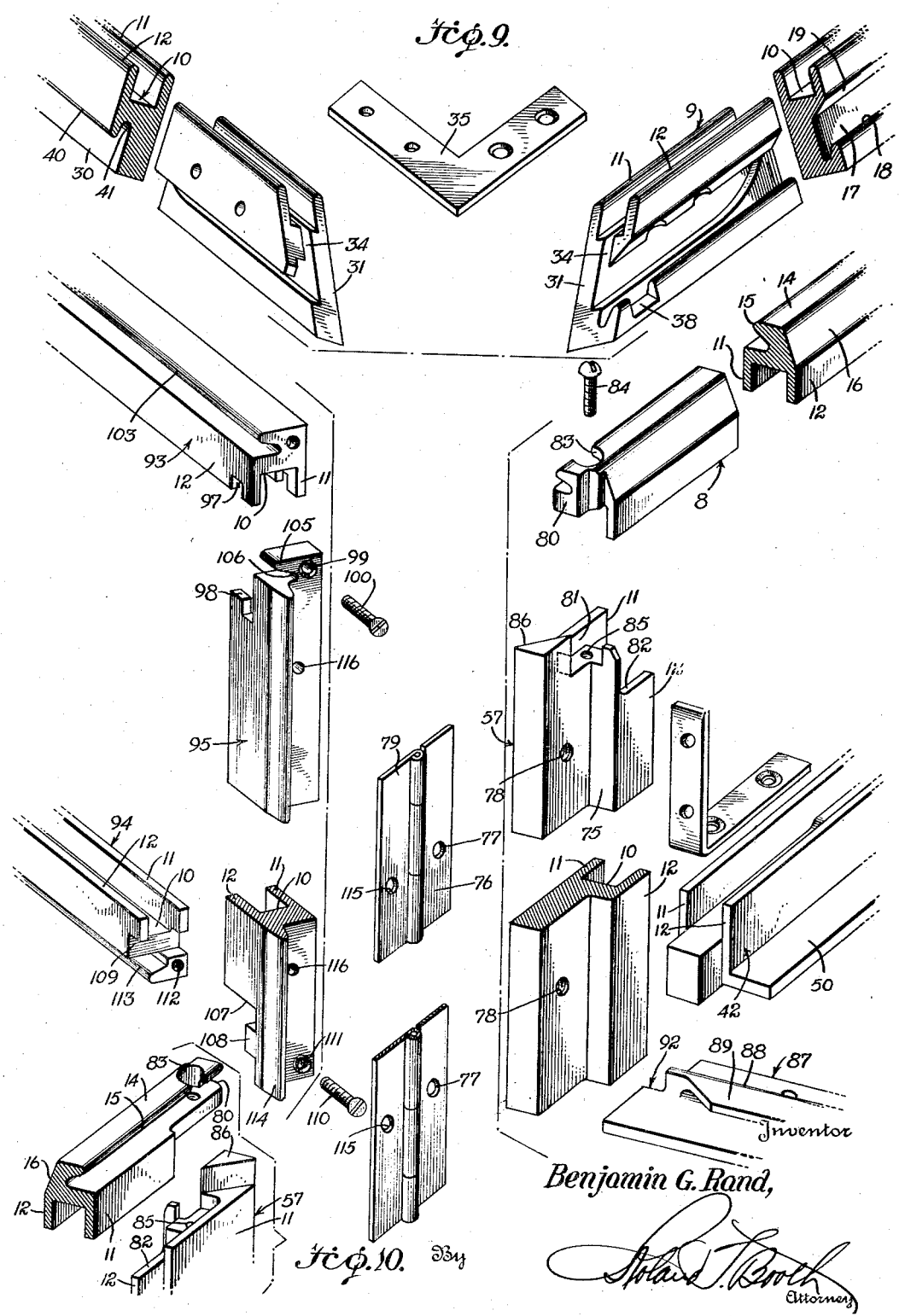

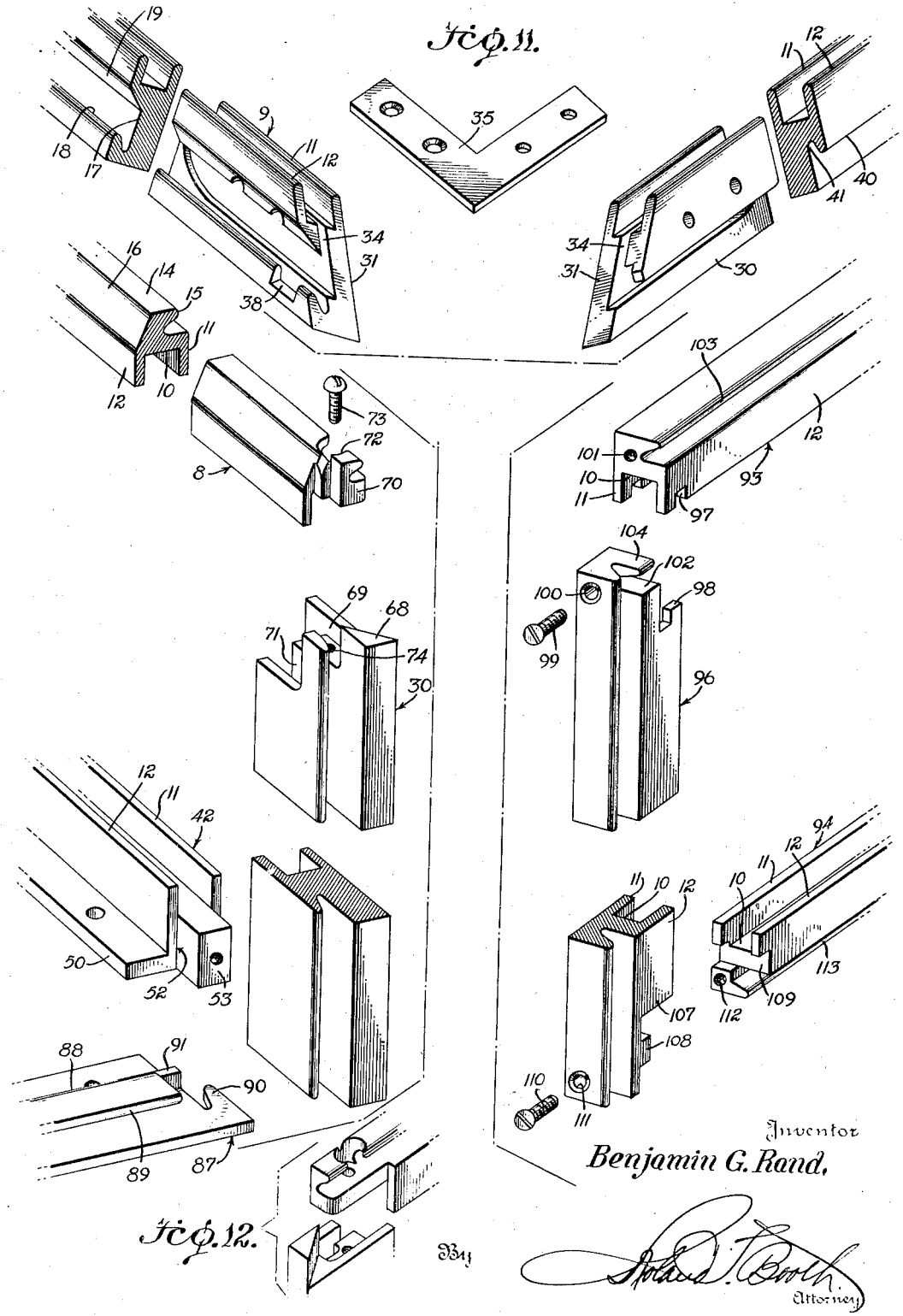

Patented Sept. 26, 1939

2,174,180

UNITED STATES PATENT OFFICE 2,174,180

MUSEUM AND DISPLAY CASE

Benjamin G. Rand, Glendale, Calif., assignor to Remington Rand Inc., Buffalo, N. Y.

Application October 12, 1937, Serial No. 168,632

16 Claims. (Cl. 312—140)

This invention relates to improvements in museum and display cases.

In certain types of display cases, particularly museum cases, it is desirable to provide a construction wherein the material being displayed is protected by a transparent walled case having assembly parts such as marginal frame members for supporting the transparent panels which provide as little obstruction to the vision of the contents of the case as it is possible to obtain without sacrificing the strength of the case structure. Various types of frame structures for mounting the glass panels have been heretofore provided in which the margins of the frames on each panel are constructed with ribs and grooves for engagement with complementary parts of the frames of an adjacent panel to which they are connected through means of screws, bolts, clips or the like. These connections between frame members of different panels for securing them together into case-forming relation are made at spaced intervals along the length of the frame members from end to end, while suitable packing material is placed between the frame members and compressed in assembly to exclude the passage of dust through the joint between the frame members.

The present invention comprehends the provision of a frame structure for display and museum cases having the frames of adjacent panels constructed for self-interlocking, thereby securing continuous attachment of each panel to the other, while a retainer member holds the frame members in their self-attached relation in a convenient manner.

The invention comprehends the provision of a self-interlocking joint connection between adjacent frames having a removable retainer holding the frames in a self-interlocked relation, in which the retainer may be arranged to carry practically no load and may also be provided with means to support shelf brackets, the retainer being further adapted to be formed from resilient material while it serves in any form to retain packing material in place to exclude the passage of dust through the joint between the frame members.

The invention comprehends the use of the retainer strips between the top frame members on side panels and the frame members on the top panel, for retaining the retainer member extending between interconnected frame members on the side panels, against detachment, in order that they may be used as shelf supports and be held in engagement between the respective side frame members.

Another feature of the invention is included in the retention of an intermediate or rear panel in interlocked relation with the top panel by means of the adjacent interlocked side panels, requiring detachment of the side panels from the top and rear panels previous to the rear or intermediate panel being detachable from the top panel..

The arrangement of the corner joints at the corners of assembled panels, the manner of constructing and connecting the frame members for interfitting and interlocking cooperation at the corners of the case and each panel, the provision of duplicate frame members on the top panel margins for securing a special cooperation thereof with the frame members on the upper edges of the side panels, and the means for preventing longitudinal sliding movement of the frame member on one panel with respect to another in the interlocked relation, all form other individual features of this invention.

In the drawings:

Fig. 2 shows a fragment of the frame members at one corner of the case in assembled relation in perspective, looking from the inside of the case upwardly toward the upper rear corner of the case.

Fig. 3 is an enlarged fragmentary bottom plan view of one corner of the top frame for the top panel, being one of the corners at the front or door side of the case.

Fig. 4 is a view similar to Fig. 3 showing one of the rear corners of the top frame, with portions broken away and shown in section.

Fig. 5 shows a bottom plan view of one of the rear corners.

Fig. 6 shows a fragment of one of the retainer members in perspective, illustrating a shelf bracket and the mounting thereof on the retainer member.

Fig. 7 is a detail vertical cross section through a fragment of a retainer member showing the mounting of a shelf bracket.

Figure 1:
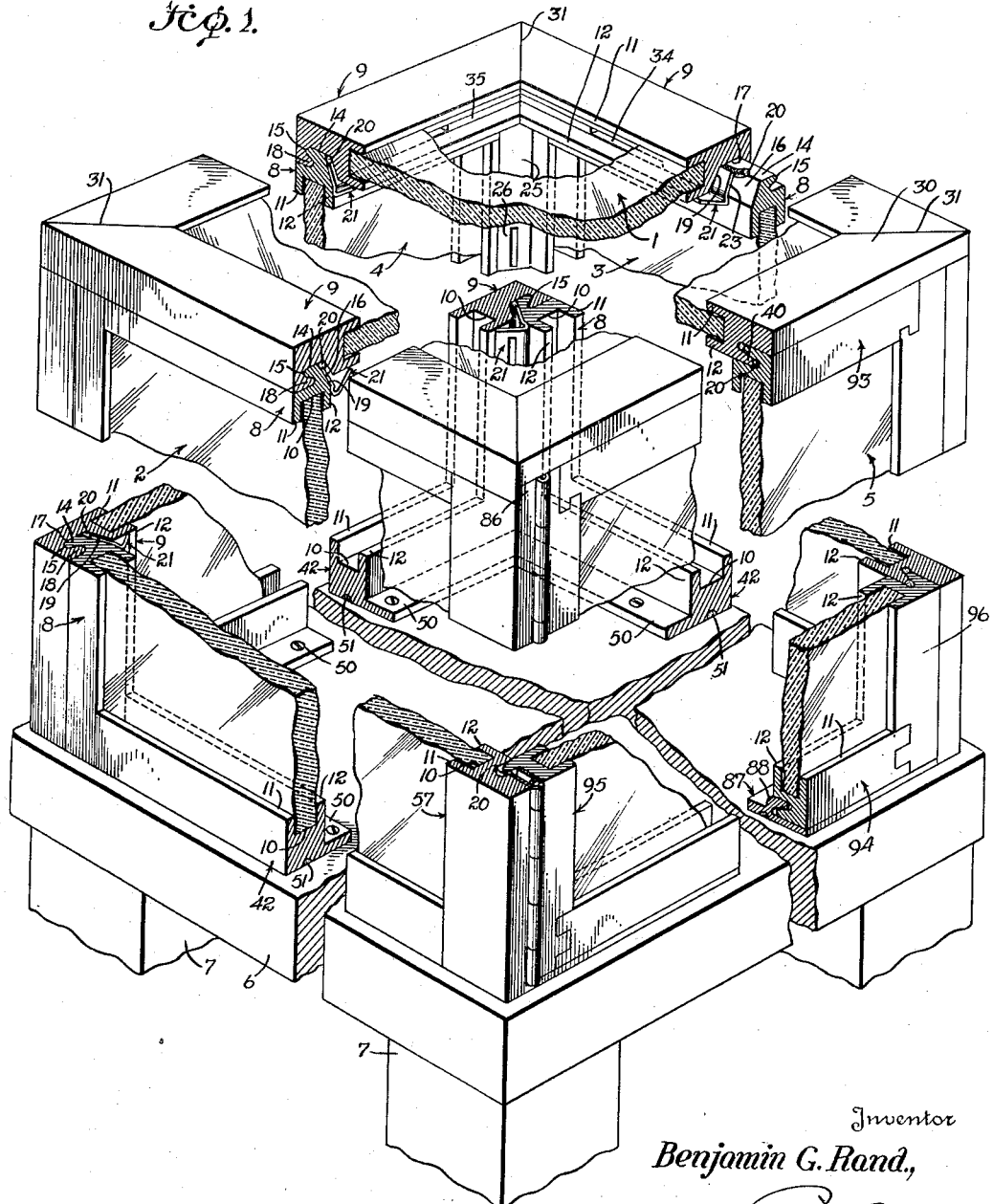
Fig. 1 shows a display or museum case constructed according to this invention in perspective, with parts broken away and shown in section in order to illustrate details of construction of the various joints between the frame members, the panels and the door structure of the case.

Fig. 8 shows portions of the top panel frame and two side panel frames in perspective, with each of the frame members in disassembled relation to each other, the portions of the top frame members being shown in substantially inverted position, and the parts of the side frame members being shown in position substantially at right angles to each other, the frames being rotated substantilaly ninety degrees in opposite directions from their normal assembled position, but each of the frame members illustrated being shown in such a position that it can be easily understood from the illustration how the members interfit in assembled relation, the frames forming the corner structure at an upper rear corner of the case such as the rear corner indicated at the top center of the drawings as viewed in Fig. 1.

Fig. 9 shows portions of the top panel frame, one side panel frame and the hinged side of the door frame, illustrating the corner joint structure of the display or museum case at the upper corner of the case where the door is hinged, in perspective, with each of the frame members in disassembled relation to each other, the portions of the top frame members being shown in inverted position, and the parts of the side frame member and the door frame being shown in a position substantially at right angles to each other, the frames being rotated substantially 90 degrees in opposite directions from their normal assembled positions, but each of the frame members illustrated being shown in such a position that it can be easily understood from the illustration how the members interfit in assembled relation.

Fig. 10 shows a fragment of the top corner of the side frame illustrated in Fig. 9, disassembled and in perspective, looking at the opposite side of the frame fragments with reference to the showing thereof in Fig. 9.

Fig. 11 is a view similar to Fig. 9 illustrating parts of the upper right hand corner of the museum case as shown in Fig. 1 at the open side of the door.

Fig. 12 is a view similar to Fig. 10, but showing the opposite side of the upper corner of the side frame with reference to the showing thereof in Fig. 11.

The drawings disclose a construction particularly adapted for a museum case, although it is to be understood that the same construction is well adapted to display cases for other purposes. The top panel is generally indicated at 1, the side panels at 2 and 3 respectively, the intermediate or rear panel is shown at 4 and the door panel opposite the panel 4 is indicated at 5. A suitable supporting base 6 is provided to support the case, which may be the top of a suitable table having legs 7, or other suitable supporting structure may be used.

Each panel includes a glass pane or panel member enclosed by edge-framing members that have complementary interengaging and self-attaching parts that retain the panels in case forming relation when interlocked with one another, in which position they are retained by suitable retainer means interposed between inter-engaged frame members.

The edge frame members for the panels comprise essentially two different types of members formed for interfitting and self-attaching cooperation, one member being called a male member for convenience and indicated by numeral 8 and the other member a female member indicated by numeral 9.

One edge of each of these members 8 and 9 is formed with a longitudinally extending panel receiving groove 10 and outer and inner flanges 11 and 12 respectively, that receive and embrace the marginal portion of a glass pane as illustrated. Suitable packing strips, not shown, are engaged on opposite sides of the pane under flanges 11 and 12 and retained in position so as to secure the frame members to the glass pane in a manner well known in the art. This construction is such that it will prevent the passage of dust between the glass pane and the frame members. It is to be understood that any other method of attaching the frame members to the glass pane may be used, if desired.

The opposite or engaged edges of frame members 8 and 9 are formed in a substantially novel manner to provide some of the several features of the invention. Male member 8 is provided on the side opposite groove 10 and along an edge thereof with a longitudinal projection 14 terminating at its outer edge in a laterally extending longitudinal rib 15. The projection 14 on the side opposite to rib 15 is provided with an inclined face 16.

Female member 9 is formed in a side adjacent to the side formed with groove 10, with a longitudinally extending undercut recess 17 forming a flange 18 extending longitudinally and inwardly to overhang the portion of the recess 17 farthest from the side formed with groove 10. The opposite portion of recess 17 from flange 18 is defined by inclined face 19. The opening into recess 17 is wide enough to receive projection 14 and rib 15 on the male member so that the outer end of projection 14 may be engaged with the bottom or inner end of recess 17 of female member 9 while inclined face 16 of male member 8 will be engaged with inclined face 19 of female member 9, these faces being in parallel relation in the engaged position of the male and female members. When male member 8 has its projection 14 and rib 15 engaged in recess 17 so that the end of projection 14 engages the bottom of recess 17, male member 8 may then be slid laterally to the direction of its insertion into recess 17 to engage rib 15 under flange 18, to interengage and interconnect the male member to the female member and as a result provide a self-attaching connection of these members to each other.

The lateral movement of male member 8 to interengage rib 15 under flange 18 as shown, will then leave a portion of recess 18 open between parallel inclined faces 16 and 19. In this position of the parts a packing strip 20 may be inserted between faces 16 and 19 into the bottom of the recess for sealing the joint between the frame members to exclude the passage of dust. This packing is retained in position in the recess by a retainer member 21.

Retainer member 21 may be in any suitable form but is preferably in the form of a sheet metal strip having a flange portion 23 engaging in recess 17 between inclined faces 16 and 19 and formed with resilient offset sections 24 to provide a resilient retainer strip for firmly holding the male and female members in their self-locked position. A flange 25 extends laterally with respect to flange 23 and is formed with a plurality of slots 26 for detachably receiving shelf brackets 27 in adjusted position thereon through the cooperation of attaching hook 28 carried by bracket 27 engaging through one of openings 26 and interlocking with retainer strip 21 in the manner illustrated in Fig. 7. It is only necessary to form the retainer members for the vertically extending frame members at the corners of the case with shelf bracket slots 26 and if desired, the retainers for the frame connections with the top panel may be made without slots 26.

Fig. 2 illustrates an inside perspective looking up at the upper corner of the case and illustrates how the ends of two retainer strips 21 securing side panel frame members and the intermediate or rear panel frame member to the top frame member may have their ends beveled as indicated at 29 for cooperation to overlap the upper end of the vertical retainer strip formed with slots 26 and thereby effectively retain the vertical retainer strip in its engaged position between the male and female members. Since the retainer strips are only frictionally engaged between the male and female members they may be driven in and pulled out of the space between inclined faces 16 and 19 by the use of a screw driver or other specially made tool. This overlapping of the retainer members on the frame members around the top panel with the vertically disposed retainer members provides a positive means for retaining said vertical retainer strips in the case to prevent their detachment accidentally through weight imposed thereon by material carried on shelves supported by shelf brackets 27.

Male and female members 8 and 9 respectively are always used on opposed engaging edges of adjacent panels, as clearly illustrated in the drawings, and are assembled in right angular relation in a rectangular case of the character illustrated with the joints between male and female members 8 and 9 disposed on one side of the assembled corner structure of the case at the outer face as indicated in Fig. 1. That is, the joint between the frame members does not come at the edge of the corner of the case. It will be further appreciated that adjacent interconnected panels have a continuous connection throughout the length of the meeting edges by means of projection 14 and rib 15 on male member 8 having self-interlocking engagement in recess 17 and with flange 18 of female member 9. This provides direct transmission of load from one panel to another and as a result little or no load is applied to the retainer strips. It is to be understood that the case will remain in assembled condition without the retainer strips being in place, although they are necessary to properly retain the male and female members in self-attached relation against sliding movement of the male member back and forth in recess 17. It will also be noted that in the assembly of a male member with a female member the operation of assembling these two members is to move the male member with its projection 14 and rib 15 toward the recessed portion of the female member and after the end of projection 14 engages the bottom of recess 17 the male member is then moved laterally to its first direction of movement in order to engage rib 15 under flange 18. Two directions of movement in planes that are laterally disposed to one another are required to assemble or disassemble a male member with a female member.

In the construction of the case disclosed in the drawings female members 9 are used on three sides of top panel 1 while a special frame member is used on the fourth side to form a door jamb for the top of the door. The door jamb frame member is indicated at 30, Fig. 1. Each of the frame members 9 and frame member 30 forming a marginal frame for the top panel have mitered ends 31 to provide diagonal corner joints. Door frame member 30 has inner and outer flanges 11 and 12 embracing the margin of the panel in the same manner as female members 9, the same type of packing and retaining means being used to retain the member on the glass pane. The end portion of each frame member is provided with a horizontal slot 34 between opposite sides as shown in Figs. 8, 9 and 11 for receiving angle member 35 formed with transverse openings so that either pins 36 or screws 37 may be used to attach angle members 35 to the end portions of female members 9 and member 30 and thereby secure the members in assembled frame forming relation with the mitered ends in abutment as illustrated in Fig. 1. Pins 36 are used to secure angle brackets 35 to door frame member 30, while screws 37 are used to secure brackets 35 to female members 9 around the top panel. Female members 9 on the top panel have the flanges 18 adjacent one of the mitered ends as shown in Figs. 8, 9, and 11 formed with a cutout section 38 to receive a projecting part on the male frame members assembled therewith for cooperation to retain the male members against longitudinal sliding movement in assembled relation with the female members. The female members also have cut-outs 39 in the ends opposite cut-outs 38, slightly smaller in size than cutouts 38 but for the purpose of receiving other projecting parts on the male members assembled therewith to further assist in holding the male members assembled with the female members against endwise sliding movement.

Door member 30 on the top panel is provided on its outer edge opposite to the edge formed with groove 10 and on its underface with a recessed portion providing an outwardly facing rib 40 and adjacent groove 41. A strip of dust-proofing material may be inserted in groove 41 to seal the joint along the upper edge of the door frame.

Intermediate side or back panel 4 is provided with a male member 8 on its upper edge and female members 9 on opposite side edges having the upper ends interconnected with male member 8 on the top edge and with a bottom frame member 42 on the lower edge. The details of construction and assembly of the frame members for panel 4 are well illustrated in Figs. 1, 2 and 8, the joint structure between the members being shown in Fig. 8. The upper end of each female member 9 on the vertical side edges of panel 4 is formed with a recess 43 extending inwardly from the end and inner side portion forming the inner edge of the frame member, while inner flange 12 has its end cut away as indicated at 44 to receive the corresponding inner flange of member 8 on the top of panel 4.

Opposite ends of member 8 on the top of panel 4 have side portions equal to the thickness of flanges 10, 11 and 12 cut away as indicated in Fig. 8 at 45 to provide a projecting tongue 46 formed to fit recess 43 in member 9 on the side of panel 4. In this way outer flange 11 of member 8 has its end abutting the inner edge of flange 11 on member 9 at each upper corner of intermediate panel 4. Inner flange 12 of member 8 has its inner edge abutting the end of flange 12 of member 9. A transverse opening is formed in tongue 46 of male member 8 aligned in assembled relation of male member 8 with female member 9 on panel 4, with threaded bore 47 to receive attaching screw 48 and provide an interlocking connection of tongue and socket type between male member 8 and female members 9 on the top and side edges of panel 4. Rib 15 of male member 8 has an opening 49 formed in alignment with the transverse bore in projection 46 to allow the head on screw 48 to pass through said opening 49 and seat on the upper face of male member 8 in the groove formed by rib 15 and projection 14. In the assembled relation of male member 8 on intermediate panel 4 with female member 9 on the back edge of the top panel the head of screw 48 engages in cut-out section 38 and cooperates therewith to form the means for retaining female member 9 and male member 8 against endwise sliding movement relative to each other in assembled relation.

Intermediate side or rear panel 4, as well as side panels 2 and 3 respectively, are each provided with a bottom member 42 of similar formation as clearly shown in Fig. 1. Bottom member 42 is provided in the same manner as male and female members 8 and 9 with groove 10 and outer and inner flanges 11 and 12 respectively. The opposite edge of members 42 from groove 10 has a laterally extending flange 50 on one side extending laterally and inwardly. The face of member 42 opposite the groove 10 is provided with a packing receiving channel 51 to receive a suitable packing strip for compression between member 42 and base 6 to dust-proof the joint between the bottom of the panel and the base, as clearly shown in Fig. 1. Flange 50 forms a securing flange to attach member 42 to base 6 and has apertures formed therein at spaced intervals to receive suitable attaching screws to mount members 42 rigidly on base 6.

Member 42 on the lower edge of rear or intermediate panel 4 has the outer and inner flanges and aligned side portions removed at opposite ends as shown in Fig. 5 at 52, to provide a projection 53 for engagement in channel 10 at the lower end of each member 9. The end of flange 50 is mitered as indicated at 54 to abut the corresponding mitered flange on members 42 carried by the lower edges of side panels 2 and 3.

The ends of member 42 in groove 10 are recessed at 55 to receive angle member 56 for attachment thereto by suitable screws. The lower ends of female members 9 on the side edges of intermediate panel 4 are similarly recessed to receive the other portion of angle member 56 for attachment thereto by suitable screws or other fastening means to assemble frame member 42 to female frame members 9 for rigidly supporting the glass pane and completing panel 4. It will be seen that the ends of flanges 10 and 11 on bottom member 42 abut the inner edges of the corresponding flanges on female members 9 on the sides of panel 4 and through angle brackets 56 and the interlocking connection provided by projection 53 with the lower end of female member 9 at each lower corner of panel 4, a substantially rigid frame structure is provided for holding the glass pane in forming panel 4.

It will be understood that bottom member 42 when assembled on the glass pane is provided with suitable packing material to seal the glass in groove 10 in the same manner as above described in connection with the assembly of male member 8 and female member 9 on the glass pane.

The top and rear side edges of side panels 2 and 3 are each equipped with male members 8 for interfitting self-attaching cooperation with female members 9 on the top and intermediate or rear panels, respectively. The bottom edges of side panels 2 and 3 are equipped with bottom frame members 42, while the front edge of side panel 2 is equipped with a door frame member 57 for the hinged side of the door while side panel 3 is equipped with a door frame member 30 for the open side of the door, the same as the door side of the top panel.

The construction of the ends of male members 8 on the top and rear edges of the side panels is shown in Fig. 8 together with the detailed construction of the lower ends of members 8 on the rear edge of the side panels and the rear ends of bottom members 42 on the side panel. The rear ends of members 8 on the top edges of the side panels 2 and 3 respectively, are recessed as indicated at 58 in Fig. 8, to receive the projecting ends 59 on member 8 on the rear edge of side panels 2 and 3 in interfitting relation. Inner flange 12 of each member 8 on the upper edges of said panels 2 and 3 has the end portion removed inwardly from the end of recessed portion 58 as indicated at 60 to receive the inner flange 12 of each member 8 on the rear edge of a side panel so that the end of flange 12 on member 8 on the top edge of a side panel will abut the inner edge of the corresponding flange on the rear edge of a side panel. Projections 14 on the upper ends of members 8 at the rear edges of the side panels are recessed as shown at 61 to provide for the reception of the end of projections 46 on members 8 carried by the upper edge of intermediate panel 4 in the assembeled relation of the panels with each other.

An assembly screw 62 engages in opening 63 in each member 8 on the rear edge of each side panel for threaded cooperation with threaded bore 64 in the end of each member 8 on the upper edge of each side panel for rigidly attaching members 8 on the upper and rear edges of the side panels in rigidly assembled relation. The interfitting of the ends of members 8 as above described together with the connection afforded by screw 62 provides an efficient interlocking connection between the ends of these male members 8 on the side panels.

The lower ends of members 8 on the rear edges of the side panels receive projections 53 on members 42, as described above, for interfitting engagement of the rear ends of members 42 on the lower edges of the side panels with the lower ends of members 8. A securing screw 65 engaged in openings 66 in the lower ends of members 8 on the rear edges of the side panels, has threaded engagement in bore 67 for rigidly attaching the lower end of frame members 8 on the rear edges of side panels 2 and 3 to bottom frame members 42.

At the front edge of panel 3, as shown in Fig. 11, the lower end of door frame member 30 is secured to the front end of member 42 in the same manner that male member 8 is secured to the rear end thereof, and in view of the illustration in Fig. 11 at the lower left-hand portion of the figure, it is not deemed necessary to add further description of this structure other than to point out that the groove in the front edge of frame member 30 receives the screw extending through a transverse opening in the lower end of the frame member for engagement in the threaded opening in the end of projection 53. It is necessary to remove a portion of the material in the groove in the front edge of the frame member to accommodate the head of the screw and provide a flat seat therefor. This detail is not shown since it should be obvious from the disclosure.

The upper end of frame member 30 on side panel 3 is formed with projection 68 on the front outer edge, while the inner edge is formed with recess 69 to receive tongues 70 on the forward end of male member 8 carried by the top edge of panel 3. The inner face of member 30 is recessed at 71 to receive the projecting end portion of inner flange 12 on male member 8 while outer flange 11 at the forward end of male member 8 on the top of side panel 3 is removed along projection 70 to an extent sufficient to receive outer flange 11 of member 30 which extends upwardly along the outer face of projection 70 to the upper edge of member 8 so that its inner edge abuts the end portion of flange 11 to provide the joint connection seen from the outer face of the cabinet. Rib 15 at the forward end of male member 8 on the top edge of side panel 3 is recessed as indicated at 72 to provide for the passage of the head of retaining screw 73 engaged through a transverse opening in projection 70 and having screw threaded connection with member 30 in screw threaded bore 74. This provides a means for rigidly attaching the end of male member 8 on the upper edge of panel 3, at its forward end in interfitting relation with door frame member 30 carried by the forward edge of panel 3, and in this way provide a rigid frame structure mounting the glass pane for panel 3, and thereby providing a complete panel structure.

Door frame member 57, Fig. 9, has one edge provided with channel 10 and outer and inner flanges 11 and 12 the same as the other frame members, while the opposite edge is constructed in a somewhat similar manner to door member 30 but without a projecting rib as in the case of door frame member 30. Frame member 57 has the forward inner edge thereof formed with an angular recess 75 adapted to receive hinge plate 76 therein for attachment to member 57 by means of suitable screws engaged through aligned openings 77 and 78 in hinge member 76 and frame 57, respectively. The other hinge plate is indicated at 79, Fig. 9, and is hingedly connected in the usual manner as shown with hinge plate 76. Hinge plate 79 is attached to the door frame in a manner to be hereinafter described.

The upper end of door frame member 57 and the forward end of male member 8 on panel 2 are interconnected in a manner similar to the upper end of door frame member 30 and male member 8 on panel 3. For this purpose male member 8 is provided with projection 80 on the forward end adapted to seat in recess 81 in the upper end of member 57, while inner flange 12 on member 57 has a section of its end removed as indicated at 82 to receive the end of flange 12 on member 8 so the upper end of flange 12 on member 57 abuts with the inner edge of flange 12 on member 8 carried by the upper edge of panel 2. Outer flange 11 at the forward end of member 8 on panel 2 is removed to receive the upper end of outer flange 11 on member 57 so the upper end of flange 11 on member 57 will engage the outer face of projection 80 and have its inner edge seat against the end portion of flange 11 on member 8. Rib 15 of member 8 on the upper edge of panel 2 is recessed as indicated at 83 to receive attaching screw 84 which engages through a transverse opening in projection 80 for threaded cooperation with threaded bore 85 in the end of frame member 57 to rigidly secure the forward end of frame member 8 on the upper edge of panel 2, to the upper end of frame member 57 in interfitting relation, as described. Frame member 57 also has a projection 86 on its forward edge to provide a finished edge at the front edge of the door opening for properly cooperating with the female member 9 on top panel 1 to avoid leaving a space between the frames at the upper front corner.

When hinge member 76 is assembled with frame member 57, the inner edge of member 76 is spaced from the inner corner of recess 75 to provide a groove to receive a packing strip along the hinged edge of the door for sealing cooperation with the door as illustrated in Fig. 1.

A bottom door frame member 87 extends between the lower ends of door frame members 30 on the front edge of panel 3 and member 57. Frame member 87 is in the form of a flat strip having an upwardly extending projection 88 formed with a forwardly extending rib on the upper end thereof as indicated at 89 to provide a rib and groove construction for receiving packing in the groove formed between rib 89 and the strip section on which it is formed, to seal the joint with the lower edge of the door as shown in Fig. 1. This member 87 has the rear edge thereof provided with apertures to receive suitable attaching screws for rigidly mounting it in position on the base 6.

One end of member 87 is provided with hooked projection 90, Fig. 11, while projections 88 and rib 89 are recessed at 91. Hooked projection 90 engages in the grooved front edge of frame member 30 on panel 3 at the lower end. The other end is recessed at 92, Fig. 9, to fit the lower end of frame member 57.

Door panel 5 includes top and bottom frame members 93 and 94 respectively, Figs. 9 and 11, and side frame members 95 and 96 respectively. Each of the frame members 93, 94, 95 and 96 are formed with channels 10 and outer and inner flanges 11 and 12 respectively, for receiving the glass pane with suitable sealing means around the margins thereof in the manner hereinabove described in connection with the other frame members.

The opposite ends of top frame member 93 have the flanges 11 and 12 provided with transversely aligned recesses 97 adapted to receive projections 98 on the upper ends of side frame members 95 and 96 respectively, to provide interlocking engagement between the upper ends of the side frames and the opposite ends of frame member 93. In forming projections 98 on side frames 95 and 96, flanges 11 and 12 are cut off and recessed to provide for the reception of the ends of member 93 in overlapping relation with the ends of members 95 and 96. Attaching screw 99 extends through transverse opening 100 in the upper end of member 96 and threadedly engages in threaded bore 101 in the end of member 93 as shown in Fig. 7, for rigidly attaching the ends of members 93 and 96 in interlocked relation. The upper end of member 96 is formed with a transversely extending recess 102 in alignment with the groove formed on the inner face of member 93 by the inwardly projecting rib 103, while a rib portion 104 on the upper end of member 96 is in aligned relation with rib 103 to form a structure symmetrically arranged with member 93.

The upper end of member 95 has a projection 105 formed thereon, symmetrical with the end of projection 103, and a groove 106 in alignment with the groove in frame member 93, to provide a symmetrical construction so that a continuous rib and groove is formed at the upper edge of the assembled frame members, for cooperation with the complementary parts of frame member 30 on the forward edge of top panel 1, enabling a packing strip carried in the groove in the forward edge of frame member 30 to be compressed therein for sealing cooperation by rib 103.

The lower ends of side frames 95 and 96 on the door panel are formed with a different type of interlocking connection than the one at the upper end. The lower ends of members 95 and 96 are recessed as indicated at 107 and formed with projections 108 extending inwardly for engagement in transverse recesses 109 formed in the ends of bottom door member 94. Attaching screws 110 extending through transverse openings 111 in the bottom ends of frames 95 and 96 are threadedly engaged in threaded openings 112 in opposite ends of bottom door member 94 for rigidly securing door frame 94 in assembled interlocked relation with the bottom ends of door frames 95 and 96.

Door frame 94 is formed with a laterally and inwardly projecting rib 113 similar to rib 103 on member 93, for engagement in the groove formed by projection 89 on bottom member 87 to compress a packing strip in the groove as shown in Fig. 1.

Door frame member 95, Fig. 9, has the inner edge opposite to that formed with groove 10 provided with an oppositely extending rib 114 adapted in the closed position of the door to engage in the rear of the rear edge of hinge plate 76 to compress the packing strip in recess 75 behind the rear edge of plate 76 of the hinge member. Hinge plate 79 of the hinge structure is secured to the rear face of door frame 95 by means of suitable screws engaged in aligned openings 115 and 116 in hinge plate 79 and frame member 95, respectively. It will thus be seen that this construction and mounting of the door panel 5 on hinge plate 79 provides for the movement of the door frame into open and closed positions to provide for access to the interior of the museum or display case in order to remove or replace specimens therein. When the door is in closed position the projecting ribs on the door frame members will compress the packing material into the grooves of the door jamb members to exclude the passage of dust around the joints between the door frame and the museum case panels.

A suitable locking mechanism, not shown, may be provided on the door or the side panel frames for locking the door in closed position.

In assembling the museum case, it will be understood that each of the glass panes are first assembled with their marginal frame members to form the complete panel structure, in which the frame members engage with the margins of the glass panes in rigid assembled relation thereon with the glass sealed in grooves 10. Then top panel 1 may be suitably supported in any suitable manner above base 6 by temporary supporting means of any character. Rear or intermediate panel 4 then has the male member 8 on the upper edge thereof interengaged with female member 9 on the rear edge of panel 1. Side panels 2 and 3 are placed in position so that male members 8 on the top and rear edges are simultaneously interengaged with female members 9 on top panel 1 and intermediate panel 4. Retainer strips 21 are next engaged between the male and female members 8 and 9 on the vertical side edges of the rear and side panels, after first placing the packing strips in place. The engagement of the retainer strips between these members serves to rigidly hold them in their self-interlocked and attached relation. The retainer members between male members 8 on the upper edges of side panels 2 and 3 and rear panel 4 are put in place against the female members on the top panel with the abutting ends overlapping the upper ends of the retainer members extending vertically at the rear corners of the case thereby preventing their removal prior to the removal of the retainer members engaged between the top panel and the side panels. It will be understood that when side panels 2 and 3 are in engaged relation with top panel 1, rear panel 4 can not be disengaged from top panel 1 or side panels 2 and 3, even though the retaining strips are not in place. It is necessary to align the panel members in proper lengthwise registry when engaging a male member with a female member in order that the cooperating parts on the members that prevent endwise sliding movement will become aligned and properly interengage.

These cooperating parts are obtained by the head of screw 48, Fig. 8, engaging in recess 38 in one of the top panel frame members, part of projection 59 engaging in recess 39 in another top frame member, the head of screw 73 engaging in another of the recesses 38, Fig. 11, and the head of screw 84 engaging in still another of the recesses 38 in the female members on the top panel.

As side panels 2 and 3 are put in place bottom door frame member 87 is also put in place for simultaneous assembly. After the parts are all assembled the screws for securing the case to base 6 may be inserted through the openings in flanges 50 of members 42 and in apertures along the inner edge of member 87. The door may then be hung on the case and the packing strip placed in the grooves around the door frame after the door frame members have been properly assembled on the glass panel to complete door panel 5.

The shelf brackets may be placed in position in the desired opening in retainer members 21 while shelf brackets may be applied to door members 30 and 57 at the front ends of the case to support shelves at the front in the same plane with the brackets carried by retainer members 21. For this purpose door frames 30 and 57 may be provided with a plurality of threaded openings on the inner faces, or the openings may be formed for the positioning of the shelf brackets after the case is assembled to prevent marring of the inside faces of the door frames exposed to view from the sides and rear of the case.

With the construction as described above, it will be seen that the male and female members provide a self-connecting interlocking joint between frames on adjacent panels to distribute the load of the case directly from one frame to the other while the retainers carry substantially no load. The retainers also provide suitable shelf bracket supports and are formed of resilient sheet metal to more efficiently operate in their cooperation with the frame members and in retaining the packing in the recesses in the female members. Since the male and female frame members are self-attached through the interlocking connections above described which extend throughout the entire length of each frame member, a substantially strong reinforced frame structure is provided for the panels and results in the provision of a much stronger museum or display case structure than heretofore obtained.

The invention claimed is:

1. In a joint for display cases, a pair of members each having complementary interengaging portions formed for self-interlocking in one position to retain said members in assembled relation connected throughout their length, and a retainer engaged between portions of said members for retaining said interengaging portions in said self-interlocking position.

2. In a dust proofing joint for museum cases, a pair of members each having complementary portions interengaging in one position in self-locking position throughout their length, a packing strip engaged between spaced portions of said members for excluding the passage of dust therebetween, and a retainer engaged between said spaced portions for holding said packing in place and said members in said self-locking position.

3. In a joint for display cases, a pair of bar members each having a panel receiving channel and complementary portions interengaging by relative movement successively in two directions into self-locking engagement throughout their length, and a retainer strip engaged between adjacent spaced portions of said members for holding them in said self-locking relation.

4. In a joint for display cases, a pair of bar members, each having a panel receiving channel, one of said members having a recess formed to provide a projection, the other member having a complementary projection formed for engagement in said recess and lateral movement therein to interlock said projection with said complementary projection to provide self-attachment of said members, said members having portions thereof in spaced substantially parallel relation, and a retainer engaged in said recess between the spaced portions of said members and retaining them in self-locking cooperation.

5. In a joint for display cases, a pair of bar members, each having one side formed to receive a panel, one member having the opposite side formed to provide a projection and adjacent recess, the other member having a projection formed to engage in said recess for lateral movement to engage the projections of each member into self-locking complementary engagement, said other member leaving a space in said recess between one side thereof and the adjacent part of the first mentioned member in interengaged relation, a packing strip engaged in said space for excluding passage of dust between said members, and a retainer strip engaged in said recess in the space between said members and holding said packing in said space and said members in self-locking relation.

6. In a joint for display cases, a pair of frame forming members, one member being formed to provide a longitudinal recess and having a flange projecting over one side of said recess, the other member being formed with a projection having a laterally extending end portion for interengagement in complementary relation in said recess with said projection and flange overlapping for self-locking cooperation of said members, said members having portions in spaced parallel relation, and a retainer strip in said recess and engaging said portions for retaining said members in self-locked cooperation.

7. In a joint for display cases, a pair of frame members, each being formed along one side with complementary interengaging self-interlocking projections, said members having spaced substantially parallel portions disposed opposite to said projections, and a resilient retainer strip frictionally engaged between said spaced portions of said members for retaining them in self-interlocked relation.

8. In a joint for display cases, a pair of frame members, one member having a recess and a flange overhanging said recess, the other member having a projection formed with a laterally extending rib, said projection engaging in said recess and said rib engaging under said flange in assembled relation of said members for self-locking cooperation, said members leaving spaced portions in said recess on the opposite side of said projection from said rib, a strip engaged in said recess between said spaced portions having offset portions resiliently retaining said members in self-locking cooperation.

9. In a joint for display cases, a pair of frame members, one member having a longitudinal recess and a flange extending over said recess, the other member having a projection formed with a laterally extending rib, said members being assembled in angular relation with said projection engaged in said recess and said rib under said flange in self-locking relation, and retainer means engaged between portions of said members for holding them in said self-locking relation.

10. A display case, comprising a plurality of angularly arranged panels, frame members embracing the margins of said panels, frame members on adjacent edges of said panels having interengaging self-locking connecting means for securing the panels in assembled relation to form a polygonal case, said frames intersecting and interengaging at the corners of said case, and retainer strips engaged between interengaged frame members for holding said frames in self-locking relation, said retainer strips extending throughout the length of the corners of said case and some of said retainer strips having their ends overlapping others of said strips at the corners of said case for retaining said other strips in engaged relation between frame members.

11. In a museum case, upright and substantially horizontal panels, frame members embracing the margins of said panels, adjacent frame members on said upright panels having interengaging self-attaching connecting means, retainer strips detachably engaged between portions of adjacent self-attached frame members on said upright panels for retaining said panels in assembled relation against disengagement of said connecting means, said retainer strips being formed to provide shelf bracket supports, said horizontal panel having the frame members thereon provided with means interengaging in self-attaching relation with complementary means on the frame members of adjacent upright panels, and retainer strips detachably engaged between said last mentioned frame members for retaining them in self-attached relation, said last mentioned retainer strips having portions overlapping the ends of said first mentioned retainer strips and retaining them from disengagement from said upright frame members.

12. In a museum case, a polygonal top panel and side panels, duplicate frame members embracing the side margins of said top panel, each having a longitudinal recess on the under side and a flange extending over said recess at one side, side frame members embracing the margins of said side panels having complementary interengaging self-attaching means on adjacent frame members to detachably connect said side panels, the side frame members on the upper edges of said side panels being formed with projections having laterally extending ribs, said projections engaging in the longitudinal recess of said duplicate frame members and said ribs engaging under said flanges for self-attaching cooperation, and retainer means engaged between portions of connected frame members to hold them in attached relation.

13. In a museum case, a top panel, side panels and a rear panel, frame members embracing the margins of each of said panels, adjacent frame members on said panels having detachable interengaging self-attaching means interlocking said panels together, said side panels retaining said means on the rear panel in self-attached position with said top panel when said side panels are in assembled relation, and retainer means detachably engaging between portions of each pair of self-attached frame members for retaining said frame members in self-attached relation.

14. In a museum case, a top panel, a pair of spaced side panels, and an intermediate panel connecting adjacent edges of said side panels, frame members embracing the margins of all of said members, the frame members on the top panel and the upper edges of the side and intermediate panels having interengaging complementary parts providing a detachable self-attaching connection between said top panel and said side and intermediate panels, the frame members on opposite side edges of said intermediate panel and said side panels having portions interengaging in complementary self-attached relation securing said panels together, said side panels having the frame members thereof cooperating with the frame members of said intermediate panel to retain said intermediate panel from detachment from said top panel, and retainer means interposed between self-attached frame members normally retaining said members in attached relation.

15. In a joint for display cases, a pair of members, longitudinally slidable complementary interengaging parts on said members providing self-attachment of said members, a retainer means engaging between portions of said members to retain said members in self-attached relation, and cooperating means on said members for retaining them in aligned relation against relative sliding movement.

16. In a joint for display cases, a pair of members, one of said members being formed with a longitudinal recess and a flange overhanging said recess, the other member having a longitudinal rib for engagement in said recess and interlocking with said flange to provide for self-attachment of said members, retainer means between portions of said members retaining them in self-attached relation, and cooperating interengaging parts extending transversely to said rib retaining said members against endwise sliding movement.

BENJAMIN G. RAND.